(12) United States Patent
Ludvig et al.

(10) Patent No.: US 7,818,766 B2
(45) Date of Patent: Oct. 19, 2010

(54) LAST CHANNEL BUTTON FUNCTIONALITY

(75) Inventors: Edward A Ludvig, Redwood City, CA (US); Daniel Danker, Sunnyvale, CA (US); David Hendler Sloo, Menlo Park, CA (US)

(73) Assignee: Microsoft Corporation, Redmond, WA (US)

( * ) Notice: Subject to any disclaimer, the term of this patent is extended or adjusted under 35 U.S.C. 154(b) by 890 days.

(21) Appl. No.: 11/239,762

(22) Filed: Sep. 30, 2005

(65) Prior Publication Data

US 2007/0079330 A1 Apr. 5, 2007

(51) Int. Cl.
*H04N 5/44* (2006.01)
(52) U.S. Cl. .......................................... 725/38; 725/59
(58) Field of Classification Search .................... 725/9, 725/10, 38, 58
See application file for complete search history.

(56) References Cited

U.S. PATENT DOCUMENTS 5,844,620 A * 12/1998 Coleman et al. .............. 725/54
6,072,535 A * 6/2000 Kearns ........................ 348/563
6,438,752 B1 * 8/2002 McClard ...................... 725/46
7,047,548 B2 * 5/2006 Bates et al. ................... 725/38
2001/0005905 A1 * 6/2001 Saib et al. ..................... 725/57
2002/0122079 A1 * 9/2002 Kamen et al. ............... 345/863
2008/0209474 A1 * 8/2008 Pjanovic et al. .............. 725/46

* cited by examiner

*Primary Examiner*—Andrew Y Koenig
*Assistant Examiner*—Jasmine Stokely-Collins
(74) *Attorney, Agent, or Firm*—Lee & Hayes, PLLC (57) ABSTRACT

Improved last channel button functionality is described. A remote control device for interacting with a media system includes a mechanism (e.g., a button) by which a user can direct the media system to automatically access a previously tuned (but not immediately previously tuned) channel; or a list of previously tuned channels. A previously tuned channel to be selected may be determined based on an amount of time that the media system was previously tuned to the channel and/or based on receipt of user command indicating user interest in the channel.

17 Claims, 9 Drawing Sheets

LAST CHANNEL BUTTON FUNCTIONALITY

BACKGROUND

Most home entertainment systems include a remote control device that enables a user to enter commands to the system by pushing a button. Many television-based remote controls include a "last" button, or something similar, that, when pressed, causes the television tuner to return to the last channel to which the television system was tuned. This functionality, although sometimes useful, does not always provide a desired result. That is, the last channel to which a television system was tuned is not necessarily the channel to which a viewer wishes to return.

SUMMARY

Improved last channel button functionality is described. A media system is configured to access multiple sources of media content, for example, by tuning to different broadcast channels, accessing previously stored media content, and so on. When a particular source (e.g., channel) has been accessed for at least some predefined minimum time period, or upon receipt of a particular user-submitted command, the media system flags the current source as a "last watched channel". Later, when tuned to any other source, a user may enter a command (e.g., through a remote control device), causing the media system to automatically tune back to the "last watched channel". In an exemplary implementation, a list of "last watched channels" may be maintained, such that a user may repeatedly submit the command, causing the media system to successively tune to each of the sources indicated in the list of "last watched channels".

DETAILED DESCRIPTION

The embodiments of improved last channel button functionality as described below may enhance a media system user's experience. For example, a user may be watching a particular television program on a particular channel, but may begin channel surfing when a commercial is aired. In a particular implementation, the user may press a single button (e.g., the "last" button) on a remote control device to return to the channel they were watching before they began surfing, rather than having to remember which channel number they were tuned to.

As another example, a user may use a channel up or channel down button to peruse programs that are currently being broadcast. During this process, the user may identify any number of channels that he would like to return to (e.g., several football programs being broadcast simultaneously on different channels). By entering a particular command (e.g., via a remote control device), the user is able to add multiple channels to a channel list. The user can then repeatedly enter another command (e.g., a "last" command) to sequentially tune the media system to each of the channels in the channel list, effectively cycling through the previously selected channels.

The following discussion is directed to improved last channel button functionality. While features of improved last channel button functionality can be implemented in any number of different computing environments, they are described in the context of the following exemplary implementations.

Figure 1:
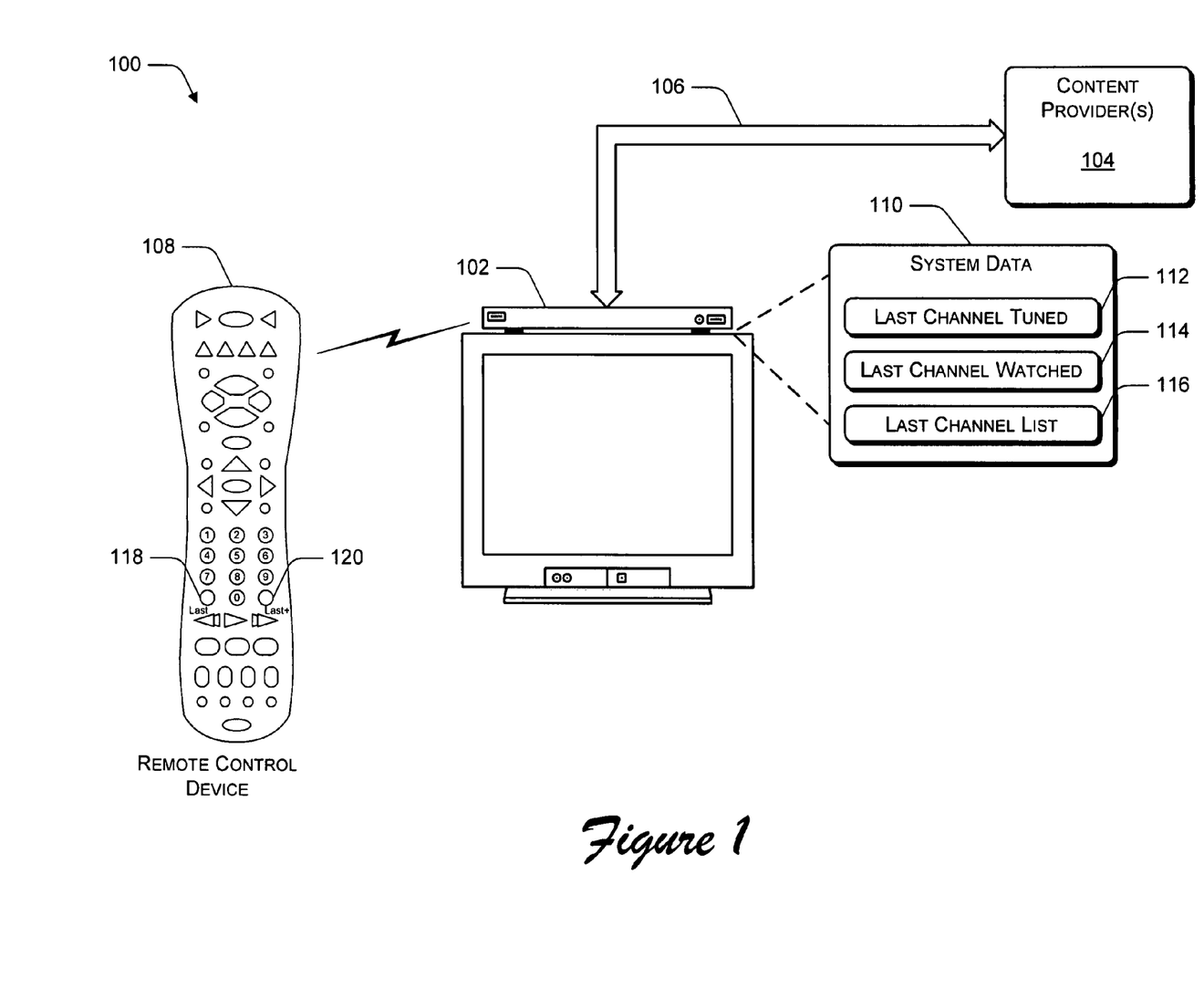
FIG. 1 is a pictorial diagram that illustrates an exemplary media system environment in which improved last channel button functionality may be implemented.

FIG. 1 illustrates an exemplary environment 100 in which improved last channel button functionality may be implemented. Media system 102 receives media content from one or more media content providers 104 over media network 106. Content providers 104 may be representative, for example, of cable or satellite television providers. Media content received over media network 106 may include, but is not limited to, video, audio, television programs, movies, music, broadcast data streams, on-demand data streams, or any combination thereof. Furthermore, media system 102 may access media content from other sources, such as a digital video recorder, radio, stereo system, personal computer, and so on. For example, media system 102 may include an integrated digital video recorder from which previously recorded media content may be accessed, and/or may be connected (e.g., via wires or a wireless network device) to a digital video disc (DVD) player from which media content stored on a DVD may be accessed. Media system 102 may be implemented in any number of ways, including, but not limited to, as a television set-top box, as a television with an integrated set-top box, as a personal computer, and so on. Remote control device 108 enables a user to submit commands to media system 102 by pressing one or more buttons on the remote control device 108.

Media system 102 maintains system data 110, which includes one or more of a last channel tuned value 112, a last channel watched value 114, and a last channel list 116. Media system 102 is configured to set the last channel tuned value 112 equal to the currently tuned channel value prior to performing any type of channel change operation. As in many existing systems, a user can direct media system 102 to tune back to the previously tuned channel indicated by the last channel tuned value 112 by pressing a last button 118 on remote control device 108.

In an exemplary implementation, a last channel watched value 114 is used to enhance the last button functionality by storing a value associated with a previously tuned channel assumed to be of interest to a viewer. In an exemplary implementation, media system 102 automatically sets the last channel watched value 114 to the current channel when the media system 102 has been tuned to the current channel for a significant period of time (e.g., five minutes). Alternatively, a user may cause the media system 102 to set the last channel watched value 114 to the current channel by entering a particular command (e.g., by pressing a last+ button 120 or by pressing and holding a last button 118). A user can then enter a command (e.g., by pressing the last button 118 or the last+ button 120), causing the media system 102 to tune back to the channel indicated by the last channel watched value 114. As described herein, the term "button" typically refers to a physical element of a device (e.g., a television set, set-top box, or remote control) that can be pressed. These buttons may also be known to those skilled in the art as "keys". Furthermore, it is recognized that the term "button" may also refer to a selectable user interface control rendered via a display device. Various implementations are considered that may utilize any combination of buttons and/or keys for the purpose of adding a channel to a list of channels and/or selecting a channel from the list. An example implementation that utilizes the last channel watched value 114 is illustrated and described in further detail below with reference to FIGS. 2 and 3.

In an alternate implementation, a last channel list 116 is used to enhance the last button functionality by storing a list of values associated with previously tuned channels of interest to a viewer. In an exemplary implementation, media system 102 may be configured to automatically add the currently tuned channel to the last channel list 116 when the media system 102 has been tuned to the current channel for a significant period of time (e.g., five minutes). Alternatively, a user may cause the media system 102 to add the currently tuned channel to the last channel list 116 by entering a particular command (e.g., by pressing or pressing and holding a last+ button 120 or a last button 118). A user can then enter a command (e.g., by pressing the last button 118 or the last+ button 120), causing the media system 102 to tune back to a channel specified in the last channel list 116 (e.g., the last channel added to the last channel list 116). The user can enter the same command repeatedly to cause the media system to effectively cycle through each of the channels indicated in the last channel list 116. An example implementation that utilizes the last channel list 116 is illustrated and described in further detail below with reference to FIGS. 4-6.

Figure 2:
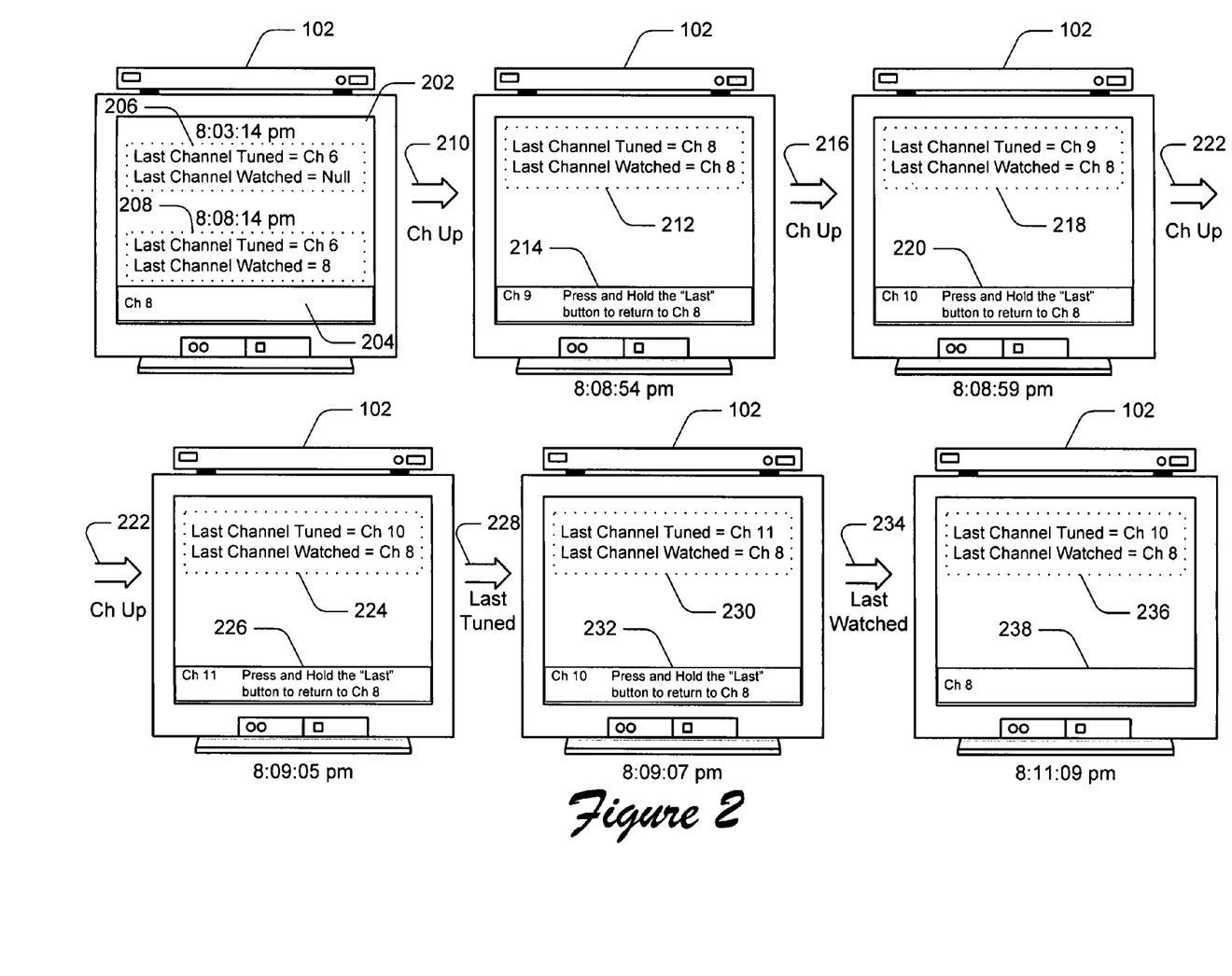
FIG. 2 is a pictorial diagram that illustrates a sequence of exemplary displays that may be presented via a media system implemented to provide improved last channel button functionality.

FIG. 2 illustrates a sequence of exemplary displays that may be presented to a user interacting with media system 102 via remote control device 108, where a last channel watched value 114 supports improved last channel button functionality. It is assumed that media system 102 is powered on at 8:03:12 pm and is tuned to channel 6. Two seconds later, at 8:05:14, media system 102 is tuned to channel 8 (e.g., in response to a command received via remote control device 108, such as the pressing of the 8 button). Display 202 includes status area 204 in which an indicator of the currently tuned channel is displayed. Additional information may also be displayed in status area 204, as will be discussed below. Boxes 206 and 208 are not intended for display, but are illustrated to show the last channel tuned value 112 and the last channel watched value 114 at various times during user interaction with media system 102.

Box 206 indicates that at 8:03:14 pm, the last channel tuned value 112 is set to channel 6, and the last channel watched value 114 is set to null. This indicates that since the media system 102 was powered on, it has not remained tuned to a single channel for at least five minutes (or some other predefined period of time). Box 206 indicates that at 8:08:14 pm, the last channel watched value 114 is automatically set to the current channel (i.e., channel 8) because media system 102 has been tuned to channel 8 for five minutes.

At 8:08:54 pm, media system 102 receives a channel up command 210. As a result, media system 102 sets last channel tuned value 112 to channel 8, as indicated by box 212, and tunes to channel 9 as indicated by status area 214. In the illustrated exemplary implementation, status area 214 also includes text indicating that media system 102 can be directed to tune back to channel 8 via a remote control command (i.e., pressing and holding the last button 118). Because the last channel tuned value 112 and the last channel watched value 114 are both set to channel 8, a simple press of the last button 118 or a press and hold of the last button 118 will cause media system 102 to tune to channel 8.

At 8:08:59 pm, media system 102 receives a channel up command 216. As a result, media system 102 sets last channel tuned value 112 to channel 9, as indicated by box 218, and tunes to channel 10 as indicated by status area 220. Status area 220 also includes text indicating that media system 102 can be directed to tune back to channel 8 by pressing and holding the last button 118. At this point, if a user presses and releases the last button 118, media system 102 will tune to channel 9 (as indicated by the last channel tuned value in box 218); if the user presses and holds the last button 118, media system 102 will tune to channel 8 (as indicated by the last channel watched value in box 218).

At 8:09:05 pm, media system 102 receives a channel up command 222. As a result, media system 102 sets last channel tuned value 112 to channel 10, as indicated by box 224, and tunes to channel 11 as indicated by status area 226. Status area 226 also includes text indicating that media system 102 can be directed to tune back to channel 8 by pressing and holding the last button 118. At this point, if a user presses and releases the last button 118, media system 102 will tune to channel 10 (as indicated by the last channel tuned value in box 224); if the user presses and holds the last button 118, media system 102 will tune to channel 8 (as indicated by the last channel watched value in box 224).

At 8:09:07 pm, media system 102 receives a last tuned command 228 (e.g., the user presses and releases the last button 118). As a result, media system 102 sets last channel tuned value 112 to channel 11, as indicated by box 230, and tunes to channel 10 as indicated by status area 232. Status area 232 also includes text indicating that media system 102 can be directed to tune back to channel 8 by pressing and holding the last button 118. At this point, if a user presses and releases the last button 118, media system 102 will tune to channel 11 (as indicated by the last channel tuned value in box 230); if the user presses and holds the last button 118, media system 102 will tune to channel 8 (as indicated by the last channel watched value in box 230).

At 8:11:09 pm, media system 102 receives a last watched command 234 (e.g., the user presses and holds the last button 118). As a result, media system 102 sets last channel tuned value 112 to channel 10, as indicated by box 236, and tunes to channel 8 as indicated by status area 238. At this point, if a user presses and releases the last button 118, media system 102 will tune to channel 10 (as indicated by the last channel tuned value in box 236); if the user presses and holds the last button 118, media system 102 will remain tuned to channel 8 (as indicated by the last channel watched value in box 236).

The functionality represented in FIG. 2 may be implemented in any number of ways. For example, the last channel watched value 114 may be set automatically when media system 102 is tuned to a particular channel for a predetermined period of time. In such an implementation, the predetermined period of time may be a preset value (e.g., configured by a network operator or hard-coded in the media system) and/or may be configurable by the user, for example, through a setup menu system. Alternatively, the last channel watched value 114 may be set in response to a command received via remote control device 108. For example, the last channel watched value 114 may be set to the current channel when the user presses a last+ button 120.

Additionally, a last tuned command 228 may be submitted to media system 102 in response to a user pressing and releasing the last button 118. Similarly, a last watched command 234 may be submitted to media system 102 in response to a user pressing and releasing the last+ button 120. Alternatively, the last watched command 234 may be submitted to media system 102 in response to a user pressing and holding the last button 118.

Furthermore, last channel tuned value 112 and/or last channel watched value 114 may store a representation of any type of channel or other means by which media content may be accessed. For example, last channel tuned value 112 and/or last channel watched value 114 may store a representation of a broadcast channel over which broadcast media content (e.g., a television program) may be accessed, a representation of an on-demand channel over which on-demand media content (e.g., on-demand programming such as movies, subscription television programs, music, and so on) may be accessed, a representation of a connection to a digital video recorder (DVR) via which previously recorded media content may be accessed, a representation of a connection to a digital video disk (DVD) player via which media content stored on a DVD may be accessed, and so on.

The implementations described herein are merely examples of ways in which a last channel watched value 114 may be set and later used to determine a channel to be tuned to. Any number of other techniques may also be used to implement similar functionality, and the examples described are not intended to be construed as limitations.

Methods for improved last channel button functionality may be described in the general context of computer executable instructions. Generally, computer executable instructions include routines, programs, objects, components, data structures, procedures, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 3:
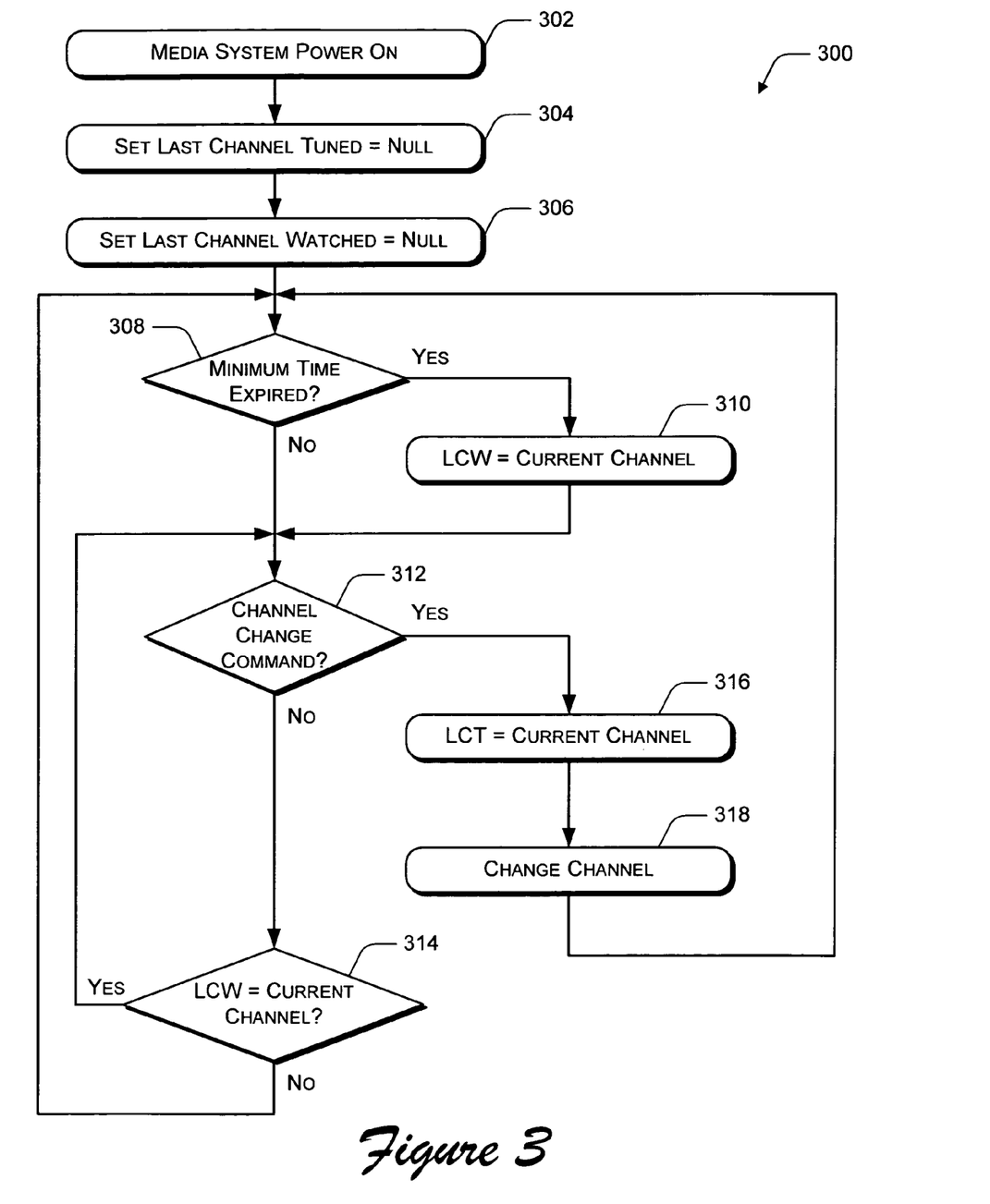
FIG. 3 is a flow chart that illustrates an exemplary method for providing improved last channel button functionality to enable automatic selection of a previously watched channel.
Figure 6:
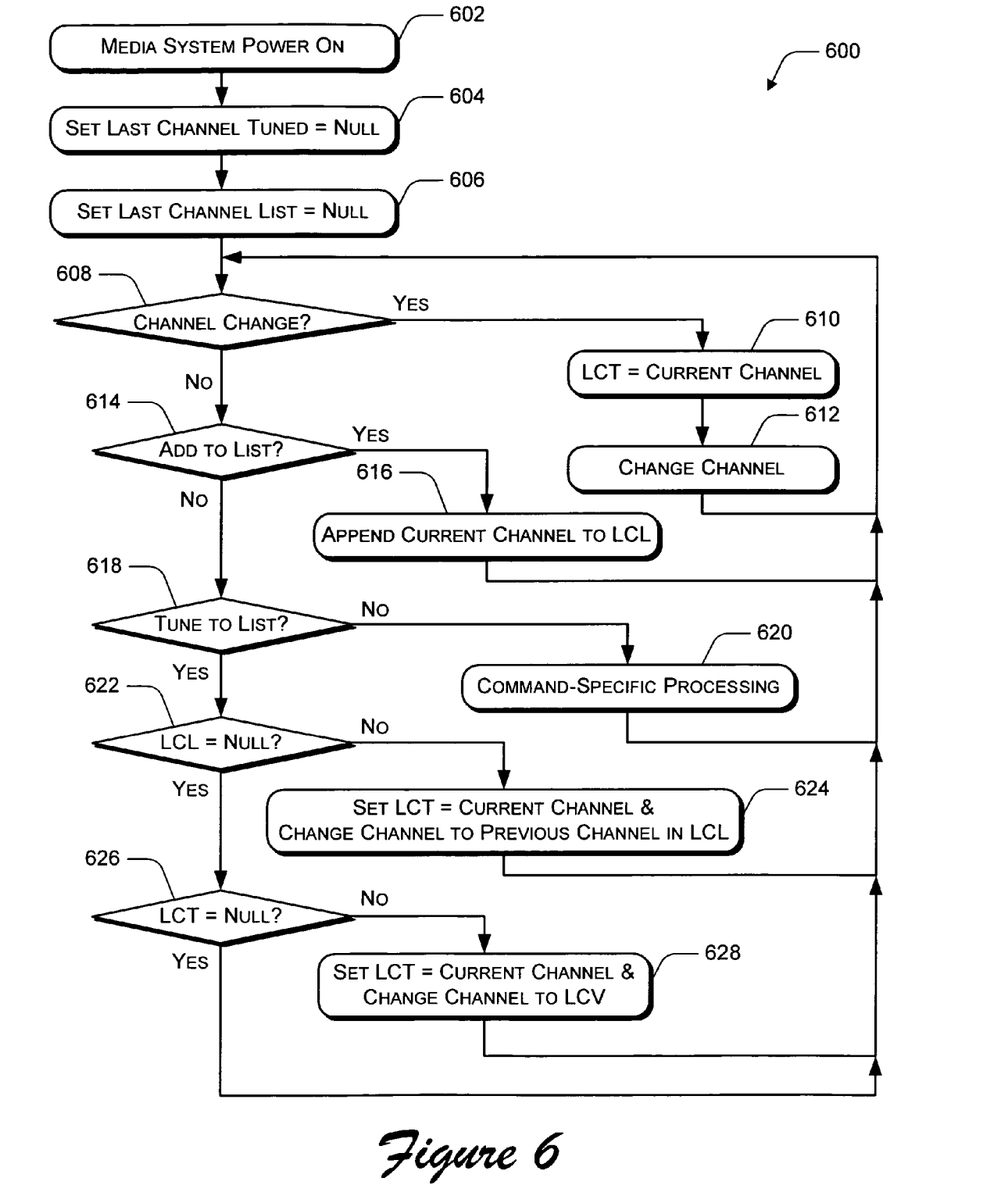
FIG. 6 is a flow diagram that illustrates an exemplary method for providing improved last channel button functionality to enable automatic selection of a list of previously watched channels.

FIGS. 3 and 6 illustrate exemplary methods for implementing improved last channel button functionality. FIGS. 3 and 6 are specific examples of improved last channel button functionality, and are not to be construed as limitations. Furthermore, it is recognized that various embodiments may implement any combination of the methods illustrated in FIGS. 3 and 6 or any combination of portions of the methods illustrated in FIGS. 3 and 6.

FIG. 3 illustrates an exemplary method 300 for improved last channel button functionality in which a distinction in made between a last channel tuned and a last channel watched. The order in which the method is described is not intended to be construed as a limitation, and any number of the described method blocks can be combined in any order to implement the method. Furthermore, the method can be implemented in any suitable hardware, software, firmware, or combination thereof.

At block 302, a media system is powered on. For example, referring to FIG. 1, media system 102 is powered on in response to a button press on media system 102 or in response to a power on command received via remote control device 108.

At block 304, a last channel tuned value is set equal to null. This indicates that since the media system was powered on, the media system has only been tuned to the current channel.

At block 306, a last channel watched value is set equal to null. This indicates that since the media system was powered on, the media system has not been tuned to any channel for longer than a pre-defined minimum period of time.

At block 308, it is determined whether or not the media system has been tuned to the current channel for at least a pre-defined minimum period of time. For example, a user-configurable time-period may be maintained by media system 102 such that if the media system remains tuned to a particular channel for at least that amount of time, it is to be assumed that a user is interested in whatever media content is being presented via that particular channel.

If it is determined that the minimum time period has not yet passed (the "No" branch from block 308), then processing continues as described below with reference to block 312. On the other hand, if it is determined that the minimum time period has passed (the "Yes" branch from block 308), then at block 310, the last channel watched value is set to the current channel.

At block 312, it is determined whether or not a channel change command has been received. A channel change command may be received, for example, from a remote control device 108, and may include, but is not limited to, a channel up command, a channel down command, a specific channel tune command (e.g., submitted when a user presses one or more number buttons on remote control device 108), a device selection command (e.g., a user may submit a command directing media system currently tuned to a broadcast television channel to access a previously recorded program stored in a digital video recorder), and so on. Channel change commands may also be automatically initiated. For example, if a viewer set a reminder or scheduled a program to record, the media system may automatically change the channel with no further input from the viewer. Such automatic channel change commands may also be received when the media system is in a standby mode, at which time the system may appear to a viewer to be powered off. In an exemplary implementation, background channel changes (e.g., while the system is in a standby mode) are detected and processing based on the channel change is performed in the same way as when a user-initiated channel change command is detected. Alternatively, a system may be implemented to ignore background channel changes with respect to setting last tuned and/or last watched channel values.

If a channel change command has not been received (the "No" branch from block 312), then at block 314, it is determined whether the last channel watched value is equal to the currently tuned channel (indicating that the media system has been tuned to the current channel for at least the pre-defined minimum period of time). If the last channel watched value is equal to the currently tuned channel (the "Yes" branch from block 314) then processing continues as described above with reference to block 312. Otherwise, processing continues as described above with reference to block 308.

If at block 312 it is determined that a channel change command has been received (the "Yes" branch from block 312), then at block 316, the last channel tuned value is set to the current value. At block 318, the media system is tuned to the channel indicated by the received channel change command. Processing then continues as described above with reference to block 308.

In an exemplary implementation, the last channel watched value may be reset when the media system remains tuned to a particular channel for at least some pre-defined period of time, as illustrated in and described with reference to FIG. 3. In an alternate implementation, the last channel watched value may be automatically reset to null when a current program or media content being presented via the current channel ends. In such an implementation, a measurement of time tuned to the current channel for comparison against the pre-defined minimum time period may be re-initiated when the last channel watched value is reset to null at the conclusion of a program.

Figure 4:
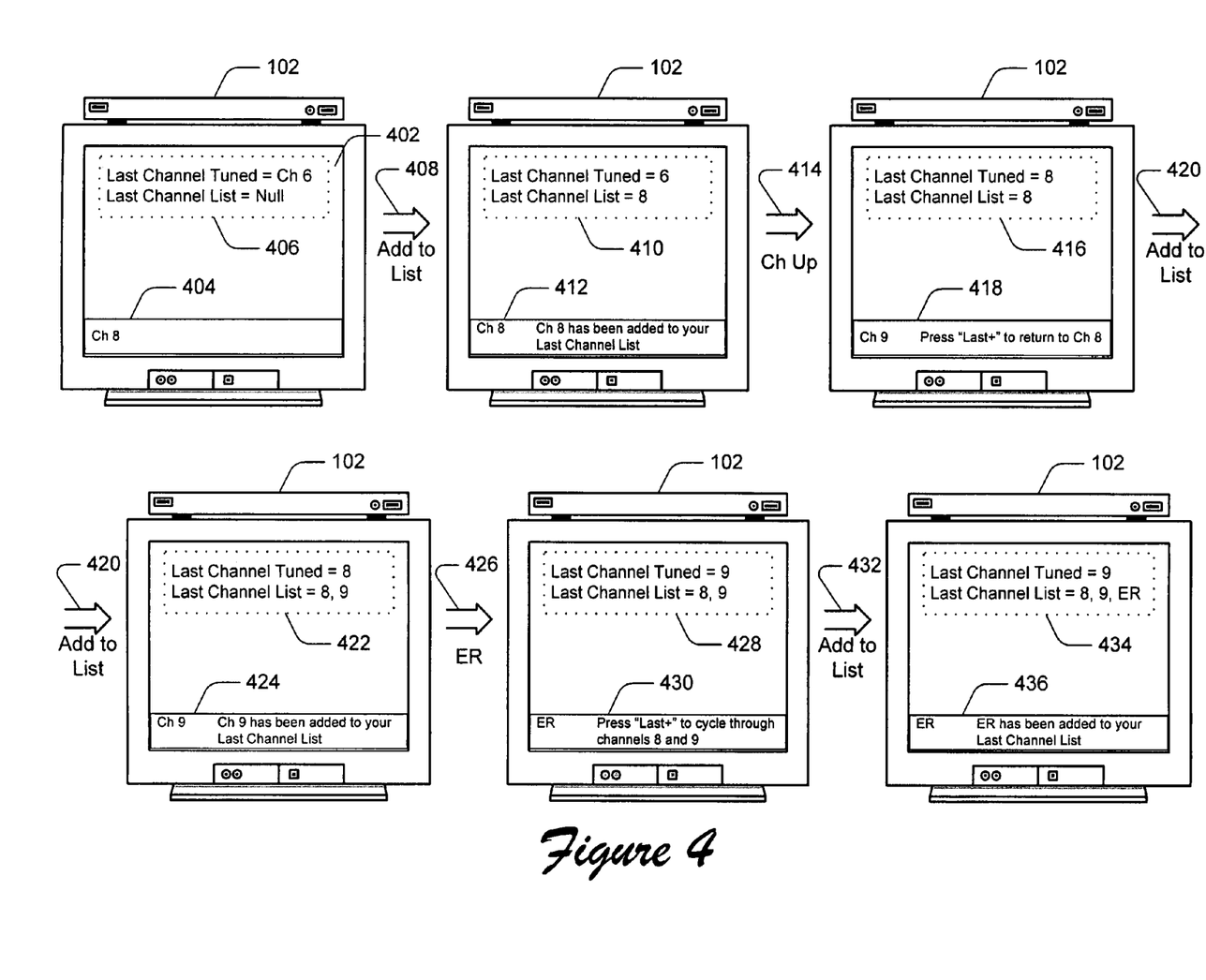
FIG. 4 is a pictorial diagram that illustrates a sequence of exemplary displays that may be presented via a media system implemented to provide improved last channel button functionality.

FIG. 4 illustrates a sequence of exemplary displays that may be presented to a user interacting with media system 102 via remote control device 108 where a last channel list 116 supports improved last channel button functionality. It is assumed that media system 102 is powered on and tuned to channel 6. Media system 102 is then tuned to channel 8 (e.g., in response to a user pressing an 8 button on remote control device 108). Display 402 includes status area 404 in which an indicator of the currently tuned channel is displayed. Additional information may also be displayed in status area 404, as will be discussed below. Box 406 is not intended for display, but is illustrated to show the last channel tuned value 112 and the last channel list values 116 at various times during user interaction with media system 102.

Box 406 indicates that when media system 102 is tuned to channel 8, as described above, the last channel tuned value 112 is set to channel 6. The last channel list 116 is currently set to null. This indicates that no channels have been selected (automatically or otherwise) for inclusion in the last channel list 116.

Media system 102 then receives an add to list command 408, which causes media system 102 to add a representation of the currently tuned channel to the last channel list. For example, a user may submit add to list command 408 by pressing and holding the last+ button 120 on remote control device 108. Accordingly, as indicated by box 410, last channel tuned value 112 is equal to channel 6 and last channel list 116 is equal to channel 8. Status area 412 now includes text that confirms that channel 8 has been added to the last channel list 116.

Media system 102 then receives a channel up command 414. As a result, media system 102 sets last channel tuned value 112 to channel 8, as indicated by box 416, and tunes to channel 9 as indicated by status area 418. Status area 418 also includes text indicating that media system 102 can be directed to tune back to channel 8 by pressing the last+ button 120. At this point, if a user presses the last button 118, media system 102 will tune to channel 8 (as indicated by the last channel tuned value in box 416); if the user presses last+ button 120, media system 102 will tune to channel 8 (as indicated by the last channel list value in box 416).

Media system 102 then receives an add to list command 420, which causes media system 102 to add a representation of the currently tuned channel to the last channel list. Accordingly, last channel list 116 now includes representations of channels 8 and 9, as indicated by box 422. The last channel tuned value 112 does not change. Status area 424 now includes text that confirms that channel 9 has been added to the last channel list 116.

Media system 102 then receives a command 426 directing it to access a pre-recorded program, "ER". For example, a user may navigate a menu system to select a pre-recorded program. As a result, media system 102 sets last channel tuned value 112 to channel 9, as indicated by box 428, and begins presenting the pre-recorded program as indicated by status area 430. Status area 430 also includes text indicating that media system 102 can be directed to cycle through channels 8 and 9 by pressing the last+ button 120. At this point, if a user presses the last button 118, media system 102 will tune to channel 9 (as indicated by the last channel tuned value in box 428); if the user presses last+ button 120, media system 102 will tune to channel 9, and if the user presses the last+ button 120 again, media system 102 will then tune to channel 8 (as indicated by the last channel list value in box 428).

Media system 102 then receives an add to list command 432, which causes media system 102 to add a representation of the pre-recorded program currently being presented to the last channel list. Accordingly, last channel list 116 now includes representations of channels 8, 9, and a representation of the pre-recorded program "ER", as indicated by box 434. The last channel tuned value 112 does not change. Status area 436 now includes text that confirms that the pre-recorded program "ER" has been added to the last channel list 116.

Figure 5:
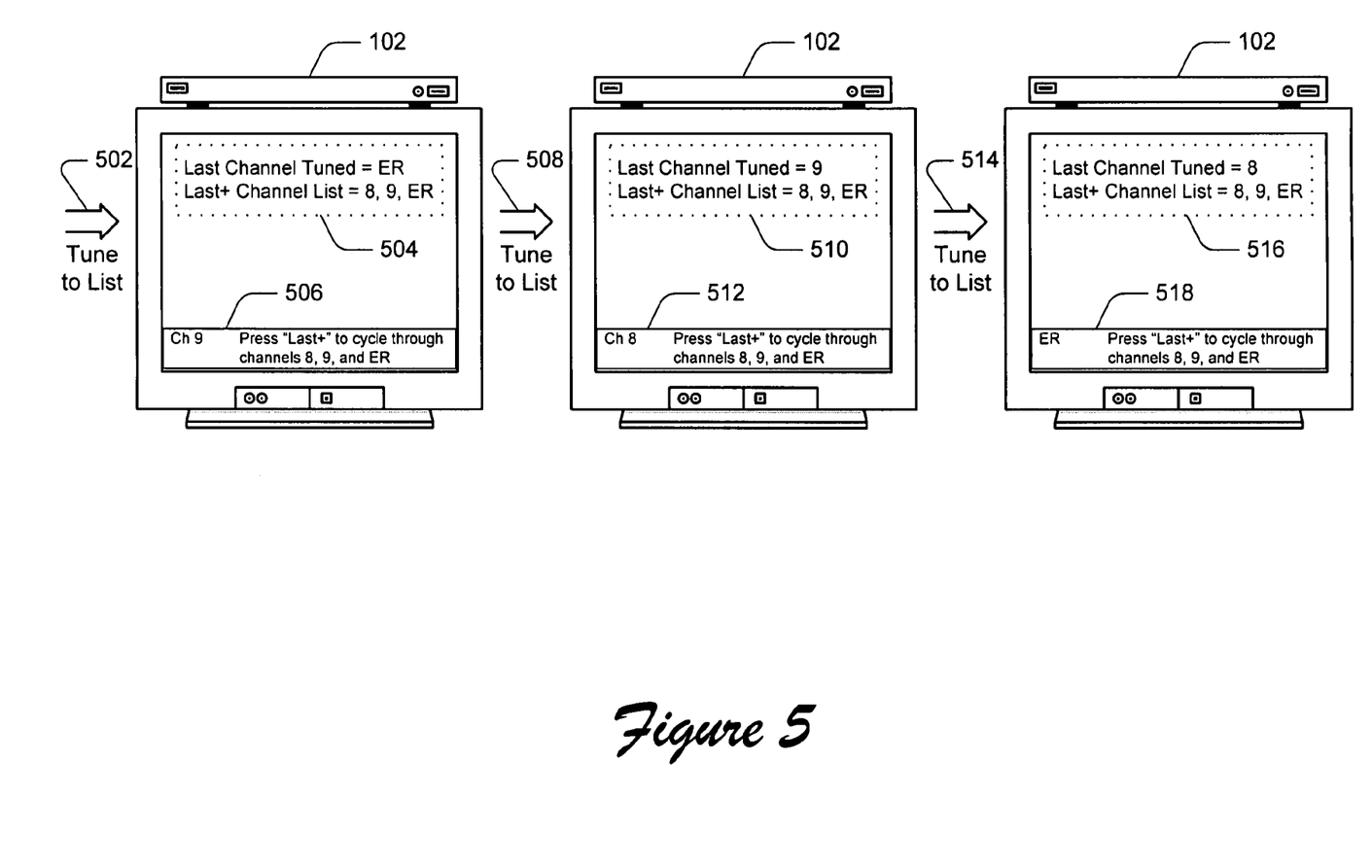
FIG. 5 is a pictorial diagram that illustrates a sequence of exemplary displays that may be presented via a media system implemented to provide improved last channel button functionality.

The functionality represented in FIGS. 4 and 5 may be implemented in any number of ways. For example, a value may be added to the last channel list 116 automatically when media system 102 is tuned to a particular channel for a pre-determined period of time. In such an implementation, the predetermined period of time may be a preset value and/or may be configurable by the user, for example, through a setup menu system. Alternatively, as described above, a value may be added to the last channel list 116 in response to a command received via remote control device 108. For example, a representation of the current channel may be added to the last channel list 116 when the user presses and holds a last+ button 120.

Additionally, a tune to list command 502, 508, or 514 may be submitted to media system 102 in response to a user pressing and releasing the last+ button 120. Alternatively, depending on the implementation, a tune to list command may be submitted to media system in response to a user pressing and holding the last+ button 120, pressing and releasing the last button 118, or pressing and holding the last button 118.

Furthermore, last channel list 116 may store a representation of any type of channel or other means by which media content may be accessed. For example, last channel list 116 may store a representation of a broadcast channel over which broadcast media content (e.g., a television program) may be accessed, a representation of an on-demand channel over which on-demand media content (e.g., on-demand programming such as movies, subscription television programs, music, and so on) may be accessed, a representation of a connection to a digital video recorder (DVR) via which previously recorded media content may be accessed, a representation of a connection to a digital video disk (DVD) player via which media content stored on a DVD may be accessed, and so on.

Various techniques may also be implemented for removing values from last channel list 116. For example, a particular channel representation may be removed from last channel list 116 when a program currently available via the represented channel ends. Alternatively, a user may submit a command via the remote control device 108 to cause a representation of the current channel to be removed from the last channel list 116. In another alternate implementation, a representation of a particular channel may be automatically removed from the last channel list 116 after a predefined period of time (e.g., 2 hours), after that channel has not been accessed for a predefined period of time, or when the media system experiences a power cycle.

FIG. 5 illustrates a sequence of exemplary displays that may be presented to a user interacting with media system 102 via remote control device 108 where a last channel list 116 supports improved last channel button functionality. Continuing after the sequence of displays illustrated in FIG. 4, it is assumed that media system 102 is currently accessing pre-recorded program "ER", last channel tuned value 112 is set to channel 9, and last channel list 116 includes representations of channels 8, 9, and pre-recorded program "ER". Media system 102 then receives a tune to list command 502. For example, a user may submit a tune to list command by pressing the last+ button 120. As a result, media system 102 sets last channel tuned value 112 to a representation of the pre-recorded program "ER", as indicated by box 504, and tunes to channel 9 as indicated by status area 506. Status area 506 also includes text reminding a user that media system 102 can be directed to cycle through channels 8, 9, and "ER" by pressing the last+ button 120. In the illustrated example implementation, media system 102 cycles through last channel list 116 in reverse order so that the last channel that was added to the list is the first channel to which the media system will return when directed to do so. At this point, if a user presses the last button 118, media system 102 will tune to channel 9 (as indicated by the last channel tuned value in box 504); if the user presses last+ button 120, media system 102 will tune to channel 8, and if the user presses the last+ button 120 again, media system 102 will then access the pre-recorded program "ER" (as indicated by the last channel list value in box 504). In an exemplary implementation, when the media system tunes away from a pre-recorded program, the pre-recorded program is paused so that when the media system tunes back to the pre-recorded program, presentation of the program continues from the point at which it was paused.

Media system 102 then receives another tune to list command 508. As a result, media system 102 sets last channel tuned value 112 to channel 9, as indicated by box 510, and tunes to channel 8 as indicated by status area 512. Status area 512 also includes text reminding a user that media system 102 can be directed to cycle through channels 8, 9, and "ER" by pressing the last+ button 120. At this point, if a user presses the last button 118, media system 102 will tune to channel 9 (as indicated by the last channel tuned value in box 510); if the user presses last+ button 120, media system 102 will access pre-recorded program "ER", and if the user presses the last+ button 120 again, media system 102 will then tune to channel 9 (as indicated by the last channel list value in box 510).

Media system 102 then receives another tune to list command 514. As a result, media system 102 sets last channel tuned value 112 to channel 8, as indicated by box 516, and accesses the pre-recorded program "ER" as indicated by status area 518. Status area 518 also includes text reminding a user that media system 102 can be directed to cycle through channels 8, 9, and "ER" by pressing the last+ button 120. At this point, if a user presses the last button 118, media system 102 will tune to channel 8 (as indicated by the last channel tuned value in box 516); if the user presses last+ button 120, media system 102 will tune to channel 9, and if the user presses the last+ button 120 again, media system 102 will then tune to channel 8 (as indicated by the last channel list value in box 516).

FIG. 6 illustrates an exemplary method 600 for improved last channel button functionality supported by a last channel list. The order in which the method is described is not intended to be construed as a limitation, and any number of the described method blocks can be combined in any order to implement the method. Furthermore, the method can be implemented in any suitable hardware, software, firmware, or combination thereof.

At block 602, a media system is powered on. For example, referring to FIG. 1, media system 102 is powered on in response to a button press on media system 102 or in response to a power on command received via remote control device 108.

At block 604, a last channel tuned value is set equal to null. This indicates that since the media system was powered on, the media system has only been tuned to the current channel.

At block 606, a last channel list is set equal to null. This indicates that since the media system was powered on, no channels of interest have been selected by a user. In an alternate implementation, values in the last channel list may be maintained through a power cycle.

At block 608, the media system determines whether or not a channel change command has been received. If a channel change command has been received (the "Yes" branch from block 608), then at block 610, the last channel tuned value is set to the currently tuned channel. At block 612, the media system tunes to the channel indicated by the received channel change command. Processing then continues as described above with reference to block 608.

If a channel change command has not been received (the "No" branch from block 608), then at block 614, it is determined whether or not an add to list command has been received. For example, an add to list command may be detected when a user presses and holds a last+ button 120.

If an add to list command has been received (the "Yes" branch from block 614), then at block 616, a representation of the currently tuned channel is appended to the last channel list. Processing then continues as described above with reference to block 608.

On the other hand, if an add to list command has not been received (the "No" branch from block 614), then at block 618, it is determined whether or not a tune to list command has been received. For example, a tune to list command may be detected to when a user presses and releases a last+ button 120.

If a command other than a tune to list command has been received (the "No" branch from block 618), then at block 620, processing specific to the received command is performed and processing then continues as described above with reference to block 608. On the other hand, if a tune to list command has been received (the "Yes" branch from block 618), then at block 622 it is determined whether or not the last channel list is null.

If the last channel list is not null (the "No" branch from block 622), then at block 624, the last channel tuned value is set equal to the current channel, a current position in the last channel list is determined, and the media system is tuned to the channel specified in the previous position in the last channel list. Processing then continues as described above with reference to block 608.

If the last channel list is null (the "Yes" branch from block 622), then at block 626, it is determined whether or not the last channel tuned value is null. If the last channel tuned value is not null (the "No" branch from block 626), then at block 628, the current last channel tuned value is determined, the last channel tuned value is set to the current channel, and the media system is tuned to the channel indicated by the determined last channel tuned value. In an alternate implementation, if a tune to list command is received and the last channel list is null, the command may be essentially ignored, and no channel change operation performed.

On the other hand, if the last channel list is null (the "Yes" branch from block 626), then processing continues as described above with reference to block 608.

Figure 7:
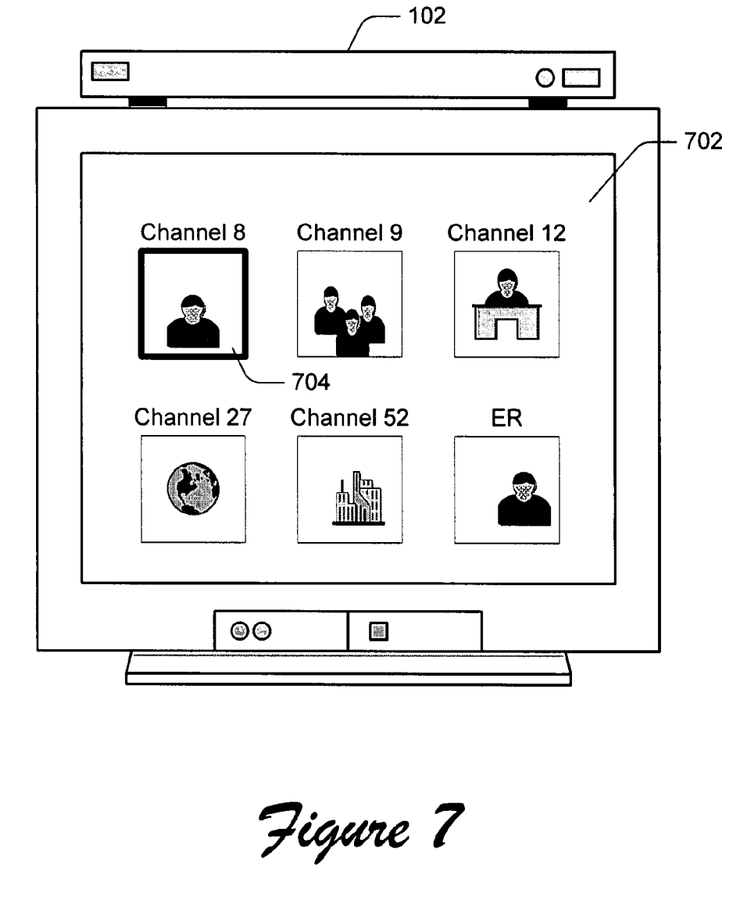
FIG. 7 is a pictorial diagram that illustrates an exemplary mosaic screen display of multiple previously selected channels.

FIG. 7 illustrates an alternate exemplary display of channels in a last channel list. In the illustrated example, when a user submits a tune to list command, display 702 is presented, which shows a mosaic of the channels currently in the last channel list. In the illustrated example, the first channel 704 is highlighted, and can be selected by the user, for example, by pressing a "select" button on remote control device 108. Similarly, the user can navigate the mosaic of channels using arrow keys on the remote control device. When the desired channel (or pre-recorded program) is highlighted and selected, the media system 102 tunes to the selected channel or program.

Figure 8:
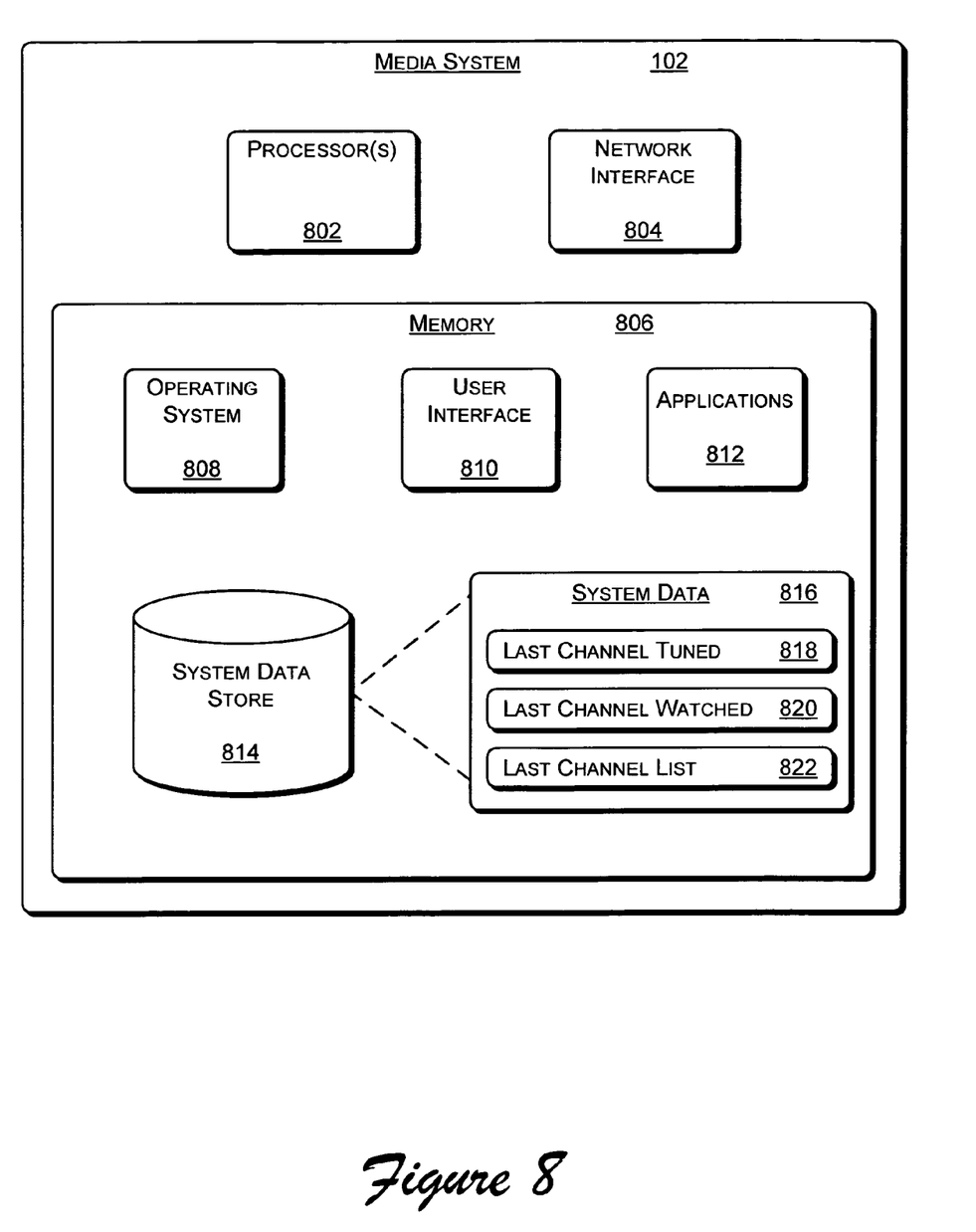
FIG. 8 is a block diagram that illustrates selected components of an exemplary media system implemented to provide improved last channel button functionality.

FIG. 8 illustrates selected components of an exemplary media system 102 configured to implement improved last channel button functionality. Media system 102 includes processor 802, network interface 804, and memory 806. An operating system 808, a user interface 810, and one or more applications 812 are stored in memory 806 and executed on processor(s) 802. Applications 812 may include, for example, an electronic program guide application. Media system 102 also includes system data store 814, stored in memory 806. System data store 814 maintains system data 816, which may include, for example, a last channel tuned value 818, a last channel watched value 820, and/or a last channel list 822.

Figure 9:
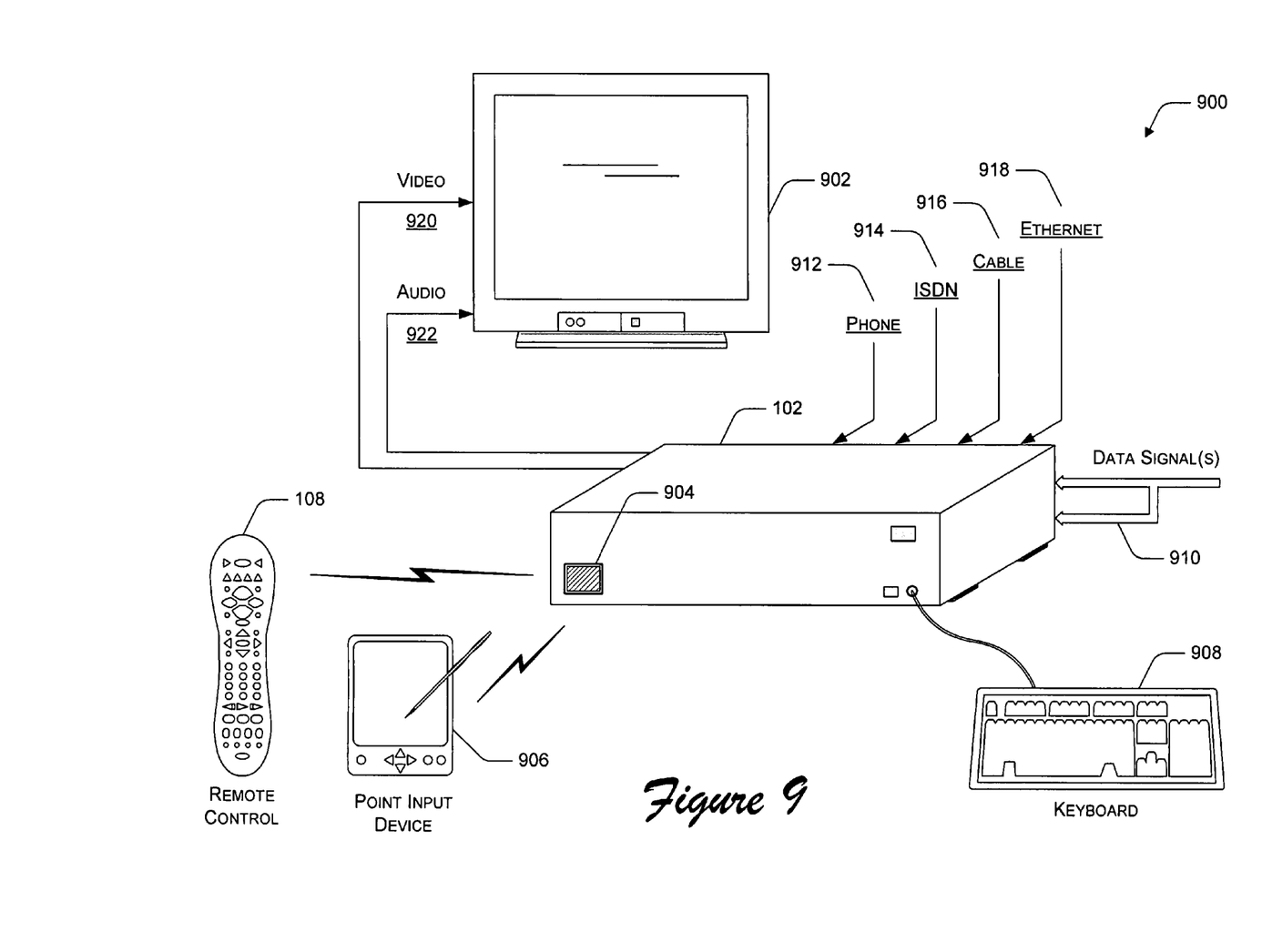
FIG. 9 is a pictorial diagram that illustrates select components of an exemplary media system environment in which improved last channel button functionality may be implemented.

FIG. 9 illustrates an exemplary environment 900 in which improved last button functionality may be implemented. Exemplary media system 102 is shown as a standalone unit that connects to a display device 902 (e.g., a television). Media system 102 can be implemented in any number of embodiments, including as a set-top box, a satellite receiver, a game console, an information appliance, an aerial antenna system, and so on. Media system 102 includes a wireless receiving port 904, such as an infrared (IR) or Bluetooth wireless port, for receiving wireless communications from a remote control device 108, a handheld input device 906, or any other wireless device, such as a wireless keyboard. Handheld input device 906 can be a personal digital assistant (PDA), handheld computer, wireless phone, or the like. Additionally, a wired keyboard 908 may be coupled to communicate with the media system 102. In alternate embodiments, remote control device 108, handheld device 906, and/or keyboard 908 may use an RF communication link or other mode of transmission to communicate with media system 102.

Media system 102 receives media content in the form of data signals 910 from one or more media sources, such as from a satellite, the Internet, a broadcast media network, or other media devices connected via a network to media system 102. Media system 102 includes hardware and/or software for receiving and decoding data signals 910, such as an NTSC, PAL, SECAM or other media system data signal.

Media system 102 is capable of communicating with other devices via one or more connections including a conventional telephone link 912, an ISDN link 914, a cable link 916, and an Ethernet link 918. Media system 102 may use any one or more of the various communications links 912-918 at a particular instant to communicate with any number of other devices.

Media system 102 generates video signal(s) 920 and audio signal(s) 922, both of which are communicated to display device 902. The video signals and audio signals can be communicated from media system 102 to display device 902 via an RF (radio frequency) link, S-video link, composite video link, component video link, or other communication link. Although not shown in FIG. 9, media system 102 may include one or more lights or other indicators identifying the current status of the system. Additionally, the media system may include one or more control buttons, switches, or other selectable controls for controlling operation of the media system.

Although embodiments of improved last button functionality have been described in language specific to structural features and/or methods, it is to be understood that the subject of the appended claims is not necessarily limited to the specific features or methods described. Rather, the specific features and methods are disclosed as exemplary implementations of improved last button functionality.

The invention claimed is:

1. A system comprising:
   a processor;
   a memory;
   a tuner application, stored in the memory and executed on the processor, configured to provide access to a plurality of media channels;
   a first data structure stored in the memory configured to maintain a representation of a last tuned channel, the last tuned channel being a previously tuned channel immediately preceding a currently tuned channel;
   a second data structure stored in the memory configured to maintain a representation of a last watched channel, the last watched channel being a previously tuned channel in which user interest has been determined; and
   a user input device configured to:
      enable user selection of the first data structure by invoking a first function of a particular button on the user input device, resulting in the tuner application automatically accessing the last tuned channel; and
      enable a user selection of the second data structure by invoking a second function of the particular button on the user input device, resulting in the tuner application automatically accessing the last watched channel.

2. A system as recited in claim 1, wherein:
   the user input device includes a remote control device;
   the first function of the particular button on the user input device is invoked by a user pressing and releasing a particular button on the remote control device; and
   the second function of the particular button on the user input device is invoked by a user pressing and holding the particular button on the remote control device.

3. A system as recited in claim 1, wherein:
   the second data structure is configured to maintain a list of a plurality of previously watched channels; and
   the user input device is configured to enable user selection of the second data structure, such that each time a user selects the second data structure, the tuner accesses a next channel based on the list of the plurality of previously watched channels.

4. The system as recited in claim 1, wherein the last watched channel includes at least one of a broadcast channel, a source for media content available on demand, a radio station, a digital video recorder, or a digital video disk player.

5. A method comprising:
   accessing, by a media system, a first media content source thereby establishing a current viewing session; and
   performing a plurality of operations during the current viewing session, the operations including:
      maintaining, by the media system, a plurality of values, including a last channel tuned value and a last channel watched value, wherein the last channel tuned value is a previously tuned channel immediately preceding a currently tuned channel in the current viewing session and the last watched channel value is a previously tuned channel in the current viewing session;
      presenting, by the media system, a media content from the first media content source; and determining, by the media system, whether a user is interested in the media content from the first media content source;

in an event that the user is interested in the media content, setting, by the media system, the last channel watched value to a representation of the first media content source;

maintaining, by the media system, the last channel watched value such that after multiple channel change commands, the first media content source can be automatically accessed in response to a user-submitted command to access a media content source represented by the last channel watched value, the user-submitted command being invoked by a first function of a particular button on a remote control device, the particular button on the remote control device having a second function to access a channel represented by the last channel tuned value;

in an event that the user is not interested in the media content, determining, by the media system, whether a channel change command is received from the user;

in an event that the channel change command is received, setting, by the media system, the last channel tuned value to the first channel; and turning, by the media system, to the channel indicated by the channel change command.

6. The method as recited in claim 5, wherein determining, by the media system, whether the user is interested in the media content includes determining that the media content has been presented for the user to experience for at least a minimum time period.

7. The method as recited in claim 5, wherein determining, by the media system, whether the user is interested in the media content includes determining that the first media content source has been accessed for at least a minimum time period.

8. The method as recited in claim 5, wherein determining, by the media system, whether the user is interested in the media content comprises receiving a user-submitted command.

9. The method as recited in claim 5 further comprising:

detecting, by the media system, an end of the media content; and in response to the detecting of the end of the media content, no longer maintaining, by the media system, the last channel watched value of the first media content source.

10. The method as recited in claim 5, further comprising:

maintaining, by the media system, a last channel list included in the plurality of values;

adding, by the media system, a representation of the first media content source into the last channel list;

determining, by the media system, whether the user is interested in media content available via a second media content source; and in an event that the user is interested in the media content available via the second media content source, adding, by the media system, a representation of the second media content source to the last channel list;

cycling, by the media system, through the first and second media content sources in the last channel list to automatically tune to the first and second media content sources in response to a user-submitted command to display channels in the last channel list.

11. One or more memory storage devices encoded with computer-readable instructions which, when executed, cause a computer system to perform operations comprising:

maintaining a last channel tuned value and a list of channels of interest, wherein the last channel tuned value is a previously tuned channel immediately preceding a currently tuned channel in a current viewing session, and the list of channels of interest includes one or more channels tuned to during the current viewing session;

enabling a user-submitted command to access the last channel tuned value by invoking a first function of a particular button on a user input device;

enabling a user-submitted command to access the list of channels of interest by invoking a second function of the particular button on the user input device;

appending a representation of a first channel to the list of channels of interest, wherein the first channel is a firstly tuned channel;

tuning to a second channel;

appending a representation of the second channel to the list of channels of interest;

tuning to a third channel;

receiving a first user-submitted command to access the list of channels of interest to the user;

in response to the first user-submitted command, tuning to the second channel;

receiving a second user-submitted command to access the list of channels of interest to the user;

in response to the second user-submitted command, tuning to the first channel.

12. The one or more memory storage devices as recited in claim 11, wherein the first function of the particular button on the remote control device is invoked by a user pressing the particular button on the remote control device.

13. The one or more memory storage devices as recited in claim 11, wherein the first function of the particular button on the remote control device is invoked by a user pressing and holding the particular button on the remote control device.

14. The one or more memory storage devices as recited in claim 11, wherein the method further comprises causing the computer system to append the representation of the first channel to the list of channels of interest to the user based on an amount of time that the computer system has been tuned to the first channel.

15. The one or more memory storage devices as recited in claim 11, wherein the method further comprises causing the computer system to append the representation of the first channel to the list of channels of interest to the user based on a user-submitted command to add the currently tuned channel to the list of channels of interest to the user.

16. The one or more memory storage devices as recited in claim 11, wherein the method further comprises:

receiving a third user-submitted command to access the list of channels of interest to the user; and in response to the third user-submitted command, continuing cycling through the list by tuning to the second channel.

17. The one or more memory storage devices as recited in claim 11, wherein the method further comprises:

detecting a delete command associated with the first channel; and in response to the delete command, removing the representation of the first channel from the list of channels of interest to the user.

* * * * *